Dec. 5, 1961     E. B. SZYMCZAK     3,011,396
PHOTOGRAPHIC EXPOSURE PROBE DEVICE
Filed June 6, 1958     2 Sheets-Sheet 1
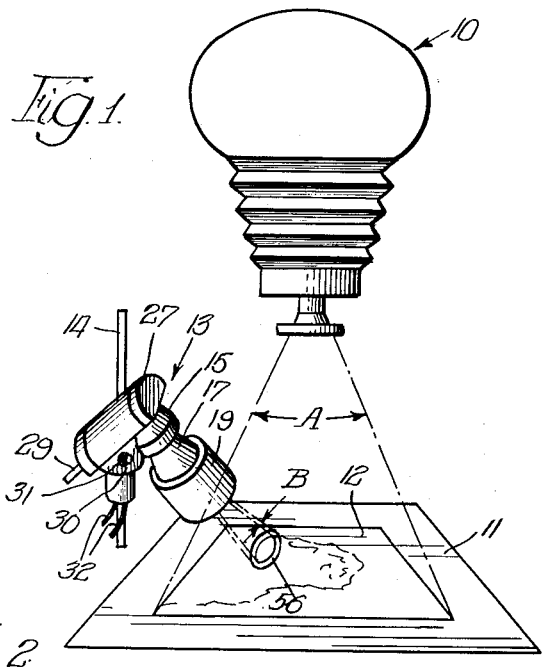
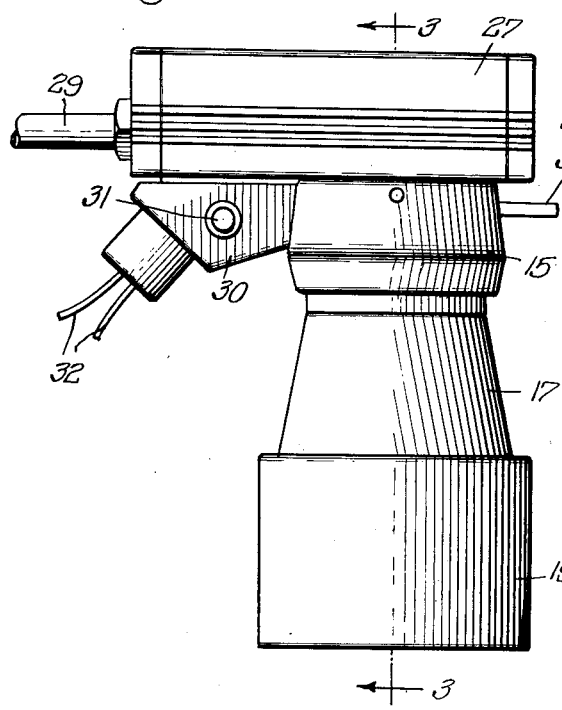
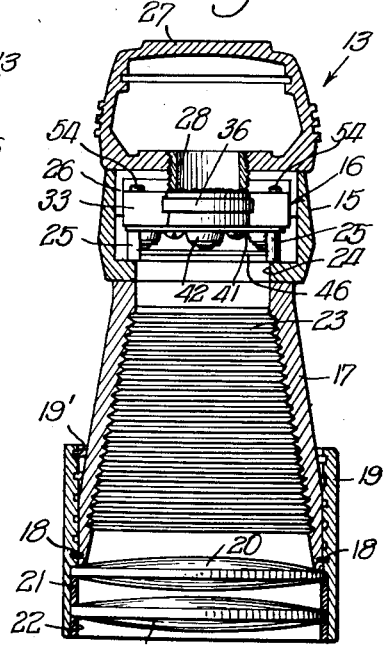
INVENTOR.
Eugene B. Szymczak,
BY
Cromwell, Greist + Warden Dec. 5, 1961 E. B. SZYMCZAK 3,011,396
PHOTOGRAPHIC EXPOSURE PROBE DEVICE
Filed June 6, 1958 2 Sheets-Sheet 2
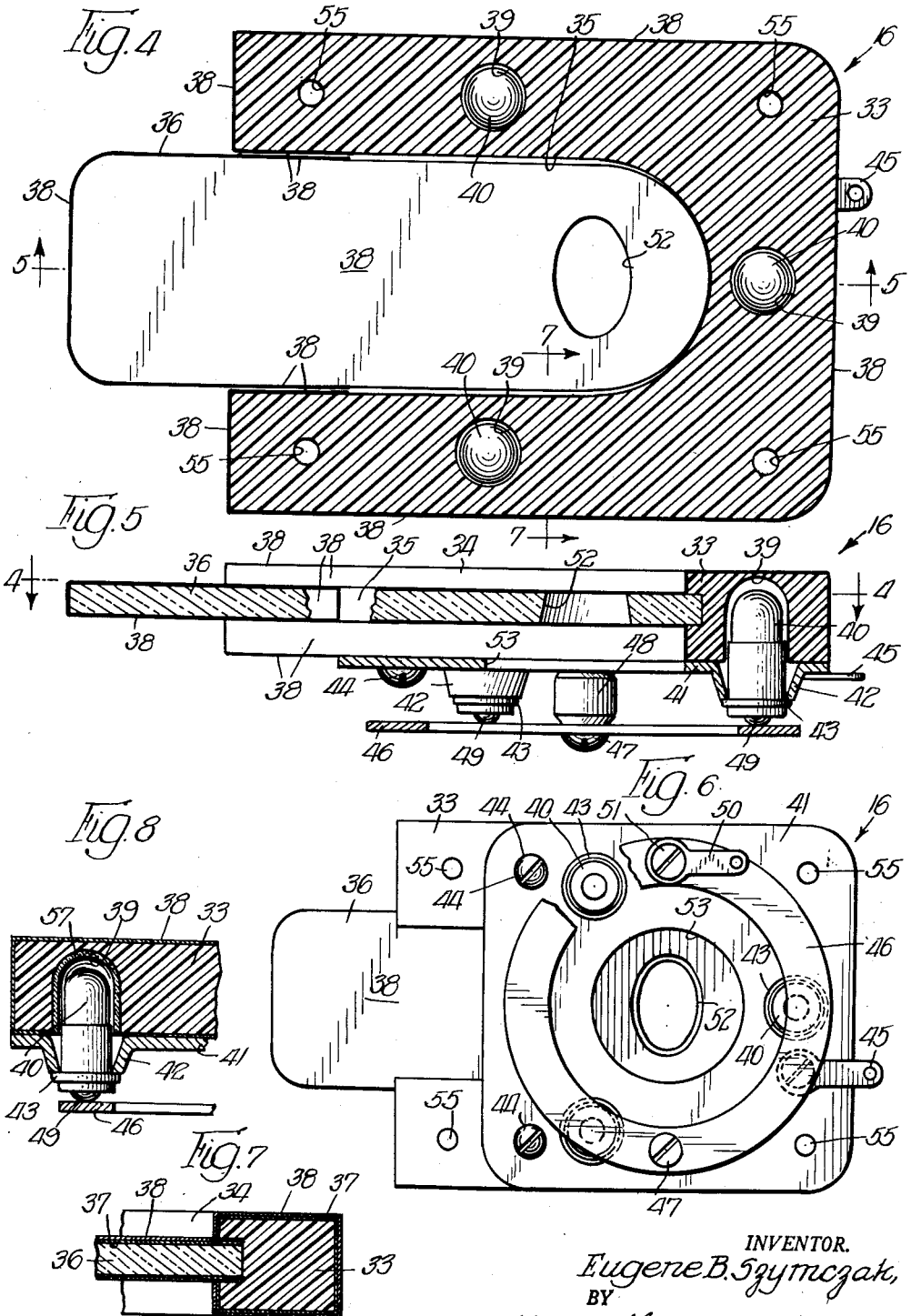
INVENTOR.
Eugene B. Szymczak,
BY
Cromwell, Greist & Warden
ATTYS.

United States Patent Office 3,011,396
Patented Dec. 5, 1961

3,011,396
PHOTOGRAPHIC EXPOSURE PROBE DEVICE
Eugene B. Szymczak, Chicago, Ill., assignor to W. M. Welch Manufacturing Company, Chicago, Ill., a corporation of Illinois
Filed June 6, 1958, Ser. No. 740,420
12 Claims. (Cl. 88—24)

The present invention relates to a new and improved form of photographic exposure probe device which provides center of interest location in connection with a projected photographic image and probe viewing of the center of interest for the evaluation of the light transmissivity or density of the negative image as a means of controlling exposure for printing purposes. More specifically, the present invention is directed to a photographic exposure probe device which includes a new and improved aperture reticle arrangement capable of functioning to combinedly pinpoint the center of interest of a projected image and allow evaluation of the light transmissivity or density of the image at this location in a new and improved manner.

Known types of exposure probe devices include those which provide a controlled beam of light used to align a photosensitive tube in the form of a probe with a predetermined image center of interest. Upon aligning the exposure probe device by use of the center of interest locating beam, the probe or photosensitive tube is exposed to the reflected light rays of the enlarger image-projecting beam within the area of the center of interest and a measurement is obtained which is used to control the time of exposure during the printing process. In the devices proposed for use in locating both the center of interest of the projected image as well as evaluating the reflected light therefrom, rather complicated optical or reflex-optical systems have been used which require continuous calibration of an extent which interferes with efficient photographic printing procedures. Not only is time consumed in actually correctively calibrating a device of this nature, but additional equipment is necessary to insure the attainment of proper calibration. Still further, proper location of the device for each image to be printed will often vary considerably and certain elements of known types of exposure probes must be adjusted or replaced in order to provide efficient functioning of the probe with varying negative images.

Among the known types of probe devices are those which utilize reflex viewing thus requiring a separate reticle for defining the center of interest location means and a separate aperture for exposing the photosensitive probe to reflected light rays. In reflex arrangements provided with a separate reticle and aperture, it is necessary to exercise considerable care in adjusting or aligning the optical axes of both the aperture and reticle so as to maintain the requisite coincidence of the same. Still further, a reflex type of probe device requires a greater number of structural elements in forming the same and is often by necessity an expensive piece of equipment of substantial size.

It is an object of the present invention to provide a new and improved photographic exposure probe device which is adapted for manufacture and use as an accessory to standard equipment, the device being formed from a relatively small number of parts of uncomplicated design and being further adapted for continued efficient use under varied conditions without the necessity of complicated, time-consuming calibration.

Still a further object is to provide a new and improved photographic exposure probe device and an aperture reticle arrangement adapted for use therein, the aperture reticle arrangement including the use of a single aperture defined by a light directing surface which controls the direction of light through a lens system of the probe device for center of interest location use, the aperture functioning additionally to permit the transmission of light flux reflected from the center of interest therethrough in a direction opposite to that of probing light and into contact with the photosensitive probe element of the device for measuring the reflected light and providing this measurement as a means for controlling exposure time during subsequent printing of the projected negative image.

A further object is to provide an aperture reticle device capable of fulfilling the foregoing objectives of the present invention and which uses but a single optical axis for both viewing and evaluating purposes, the combined viewing reticle and evaluating aperture being removably carried by a slide thus adapting the device for use with different shapes and sizes of aperture reticles, each of a series of slides being readily and inexpensively manufactured and further readily inserted and removed during varied use of the probe device, the slide housing having light sources associated therewith which provide the viewing functioning of the device, the light sources being associated with the slide housing in such a manner as to allow ready and easy replacement of the same.

Other objects not specifically set forth will become apparent from the following detailed description made in conjunction with the drawings wherein:

FIG. 1 is a schematic perspective of a negative printing arrangement wherein the improved photographic exposure probe device of the present invention is used;

FIG. 2 is a side elevation of the probe device;

FIG. 3 is a partial vertical section of the probe device taken generally along line 3—3 of FIG. 2;

FIG. 4 is an enlarged sectional plan view of the aperture reticle device of the present invention taken generally along line 4—4 of FIG. 5;

FIG. 5 is a vertical section of the aperture reticle device having portions thereof broken away and being taken generally along line 5—5 of FIG. 4;

FIG. 6 is a bottom plan view on reduced scale of the aperture reticle device having portions thereof partly broken away;

FIG. 7 is an enlarged fragmentary section taken generally along line 7—7 of FIG. 4; and FIG. 8 is an enlarged fragmentary sectional view of a modified form of internal lighting arrangement.

In FIG. 1 a known type of enlarger 10 is schematically illustrated as being suspended above a work surface 11 on which sensitive photographic paper is held or periodically advanced for exposure to the enlarger projected negative image 12. The work surface 11 or the photographic paper held thereby will reflect the image of the negative 12 to the improved photographic exposure probe device of the present invention generally designated by the numeral 13 which is positionably held to one side of the work surface 11 by any suitable type of support. The support, for example, may include an upstanding rod 14 along which the probe device 13 may slide in a vertical direction and be fixed in a predetermined vertical position by means of clamping means forming a part of the mounting arrangement. The schematically represented beam A is the projecting beam of the enlarger 10 which projects the negative image onto the work surface 11. The schematically represented beam B is that which is projected onto the work surface 11 by the probe device 13 and provides the reticle image for use in locating or fixing the center of interest of the projected negative image 12.

Referring to FIGS. 2 and 3, the probe device 13 includes a light-tight housing 15 which receives therein an aperture reticle device generally designated by the numeral 16 and forming a part of the present invention. The lower portion of the housing 15 is integrally attached with a downwardly directed, cone-shaped housing 17 which at the lower portion thereof is attached by pins 18 to a lens system housing 19. The inner surface of the housing 19 is provided with a continuous helical groove 19' into which the pins 18 are received so as to allow the lens system housing 19 to be threadedly moved relative to the bottom portion of the housing 17. A convex lens system formed from two cooperating lenses 20 are carried within the lens housing 19 by an annular lens spacing ring 21 and a lens retainer ring 22. The inner surface of the cone-shaped housing 17 is provided with rifling or buttress threads 23 of a known type for baffling stray light and, in effect, trapping and absorbing the same. The thread surfaces are coated with a substantially non-reflective material such as black paint and this type of surface in cooperation with the functioning of the threads prevents stray light from affecting the operation of the probe device 13. The bottom portion of the housing 15 is provided with an opening 24 which is axially aligned with the lens system.

The aperture reticle device 16 is received within the housing 15 and supported therein by spaced legs 25 which rest on the bottom surface of the housing 15 about the opening 24. The top portion of the housing 15 has received therein a bracket 26 which locates the aperture reticle device 16 centrally within the housing 15 and further carries a threaded opening which is aligned with a threaded opening in the bottom surface of a probe housing 27. A holding ring 28 which is externally threaded is received through the aligned openings in the bracket 26 and probe housing 27 and contacts the top surface of the aperture reticle device to hold the same and the supporting legs 25 thereof firmly in the housing 15. The ring 28 further functions to removably hold the probe housing 27 to the top of the housing 15.

The probe housing 27 has received therein a photosensitive tube (not shown) which is interconnected with any other suitable type of timing or indicating apparatus by a flexible cable 29. The probe unit including the housing 27 is standard equipment which is readily available. Thus, it will be noted that the improved aperture reticle device of the present invention, which includes the complete unit of the housings 15, 17 and 19, is readily adapted for attachment by use of the holding ring 28 to the conventional probe 27 to place the improved device in the category of an accessory to equipment which is readily available on the market. To operate the aperture reticle device 16 in the manner to be described, a switch housing 30 is formed integral with the aperture reticle housing 15 and carries a button switch 31 for operating the same with power supplied through flexible leads 32.

In FIGS. 4-7 the aperture reticle device 16 is illustrated as including a block-like slide holder 33 formed from a translucent acrylic plastic sold under the trademark "Plexiglas." The slide holder block 33 is U-shaped and the inner peripheral surface 34 of the same is provided with a continuous, outwardly opening groove 35 which slidably receives therein a flat apertured slide 36. The slide 36 is preferably formed from the same type of material as the block 33 and is translucent for a purpose to be described. As particularly shown in FIG. 7, all of the surfaces of the block 33, with the exception of certain surface portions to be specifically designated, carry an inner coating 37 of reflective material, such as an aluminum vacuum coating, and an outer coating 38 of opaque material, such as black paint. The combined coatings 37 and 38 cover the entire inner peripheral surfaces 34 with the exception of the surfaces defining the groove 35 along a continuous area inwardly from the opening of the slide-receiving portion starting inwardly from the points shown in FIGS. 4 and 5. In other words, all of the outer surfaces of the block 33 are coated as described except the continuous surface portions defining the remainder of the groove 35 beginning from a point inwardly of the ends thereof.

The block 33 is further provided with lamp-receiving openings 39 which extend upwardly from the bottom surface of the block 33 to terminate short of the top surface thereof. The lamp-receiving openings 39 are equally spaced about the apertured end of the slide 36 and the surfaces defining the same are uncoated. Lamps 40 are positioned within the openings 39 and are received through a lamp holding plate 41 which is provided with downwardly flanged openings 42 for this purpose. Each of the lamps 40 is provided with an annular flange 43 about the lower portion thereof which abuts the edge of an associated flanged opening 42 to limit the extent to which the lamp 40 moves upwardly into the associated lamp opening 39. The lamp holding plate is attached to the bottom surface of the block 33 by spaced screws 44 and one of such screws attaches a contact terminal 45 thereto. The lamps 40 are held in contact with the lamp holding plate 41 through their annular flanges 43 by a contact ring 46. Screws 47 carrying spacers 48 are removably received within the block 33 and hold the contact ring 46 in engagement with the contact terminals 49 of the lamps 40. Consequently, abutment between the annular flange 43 with the edge of the flanged opening 42 fixes the extent of movement of each lamp 40 into a lamp-receiving opening 39. Supporting engagement between the contact ring 46 and the contact terminal 49 of each lamp 40 holds the flange 43 in abutment with the flanged opening 42. As shown in FIG. 5, a terminal contact 50 is attached to the lamp holding ring 46 by a terminal screw 51 to complete the lamp actuating electrical circuit.

The manner in which the lamps 40 are operatively mounted in their respective lamp openings 39 in the block 33 is of particular importance in maintaining efficient operation of the aperture reticle device 16. In the event that the replacement of a lamp 40 is necessary, the ring 46 may be readily removed and each lamp 40 taken out of its respective lamp opening 39. For lamp replacement purposes it is necessary merely to use a single tool such as a screw driver and no special skills are required in accomplishing this aspect of aperture reticle maintenance.

The slide 36 is provided with an aperture near its innermost end which, as shown in the drawings, is defined by a frusto-conical surface 52 having its largest diameter facing downwardly. The surface 52 is aligned with a central aperture 53 in the lamp holding plate 41 which, in turn, is aligned with the center portion of the lamp holding ring 46. This arrangement is particularly shown in FIG. 6. The outer surfaces of the slide 36, as particularly shown in FIG. 7, are provided with an inner coating 37 of reflective material, such as aluminum paint, and an outer coating 38 of opaque material, such as black paint. The vertical side surface of the slide 36 in close association with the aperture reticle defined by the surface 52 is uncoated to an extent as particularly shown in FIG. 4 for alignment with the uncoated surfaces of the groove 35 of the block 33. Consequently, when the slide 36 is fully inserted within the block 33, the uncoated vertical side surfaces of the slide 36 and the groove 35 coincide as shown in FIGS. 4 and 7. The remaining portion of the continuous vertical side surface of the slide 36 is coated as shown in FIG. 4 and this portion extends from a point inwardly of the ends of the groove 35, outwardly therefrom and about the entire end surface of the slide 36. The top and bottom surfaces of the slide 36 carry the coatings 37 and 38 and the reticle aperture surface 52 is uncoated.

The aperture reticle device 16, as previously described in connection with FIG. 3, is carried by spaced supporting blocks 25 within the housing 15. Referring particularly to FIG. 3, screws 54 are passed through apertures 55 in the block 33 (see FIGS. 4 and 6) and are threadedly received in the top end surfaces of the supporting legs 25 to attach the same to the block 33. The holding ring 28 contacts the top surface of the block 33 to, in effect, clamp the aperture reticle device 16 in the housing 15.

In the operation of the aperture reticle device 16, the block 33 and slide 36 are preferably formed from non-actinic red translucent material. Various types of plastics, such as a translucent acrylic plastic sold under the trademark "Plexiglas," may be pigmented to form a non-actinic red block and slide and, while the color red is more often used, it should be understood that any non-actinic coloring may be imparted to the block 33 and slide 36. The button switch 31 controls the operation of the lamps 40 and is normally maintained in opened condition to cause operation of the lamps 40 upon depressing the same. The light of the lamps 40 is diffused through the translucent block 33 and internally reflected therein by the presence of the inner coating 37 while being prevented from straying outwardly of the block 33 into the housing 15 due to the presence of the outer opaque coating 38. The opaque coating 38 further prevents external light from interfering with efficient functioning of the probe device 13.

With the energization of the lamps 40, a red light is passed through the uncoated surface portions of the groove 35 and the adjacent side surfaces of the slide 36 into contact with the aperture reticle surface 52. This latter surface being uncoated projects a continuous red band of light downwardly through the central opening 53 of the lamp holding plate 41, through the center of the contact ring 46, down through the cone-shaped housing 17, through the lens system and onto the projected image 12 on the work surface 11. As shown in FIG. 1 a circular band 56 is projected onto the negative image 12 to spot or locate the predetermined center of interest of the image. The aperture reticle surface 52 being frusto-conical is further elliptical in shape and the lens system functions to project the ring of red light 56 in the form of a circle on the negative image 12. Thus a continuous and definitely observable ring of red light is provided for use in fixing the center of interest location.

The aperture reticle surface 52 functions not only to provide the center of interest locating ring of light 56 but further allows the passage of light flux therethrough in an upward direction into contact with the phototube carried within the probe housing 27. Light reflected by the work surface 11 in a direction toward the probe device 13 passes upwardly through the lens system, the cone-shaped housing 17, through the center of the contact ring 46, through the opening 53, through the center of the aperture reticle surface 52, upwardly through the holding ring 28 and into contact with the phototube carried within the probe housing 27. Thus a source of light flux for measuring the light transmissivity or density of the negative image 12 is allowed to contact the phototube in the probe housing 27 to obtain an accurate measurement for use in determining or controlling exposure time.

The location of the lens system carried by the lens housing 19 is such that the reflected light rays passing through the aperture in the slide 36 cross one another so as to provide a substantially dispersed field of light which contacts the phototube in the probe housing 27. Consequently, point fatigue does not occur in the operation of the phototube and a substantial area of the same is contacted by the reflected measurement-supplying light flux. This arrangement is possible due to the use of coinciding optical axes with respect to both the reticle and aperture operation resulting from the use of a reticle which actually defines the aperture. Focusing of the projected reticle by adjustment of the lens-carrying housing 19 automatically controls the area of the beam contacting the phototube. A single adjustment of the lens system will accomplish complete calibration of the entire device in connection with both its functioning in center of interest location and image evaluation.

FIG. 8 illustrates a modification in certain features of the block 33 of the aperture reticle device 16. In this modification the block 33 is formed from colorless translucent material and each of the lamp-receiving openings 39 has inserted therein a cap 57 of translucent, non-actinic colored material which provides the source for the non-actinic light. The lamp 40 is held within the lamp-receiving opening 39 and within the colored cap 57 in the same manner as illustrated and described in connection with FIGS. 5 and 6. The only difference residing in the structural elements of the modified form of block 33 of FIG. 8 is that the non-actinic color is provided by a separate cap-like source rather than the material of the block 33 being colored or pigmented in the forming of the same as earlier described.

The frusto-conical surface 52, as described above, serves a dual purpose in functioning as the projected reticle for center of interest location and further serving as a field stop for phototube viewing. The aperture reticle device 15 may be provided with a number of different slides 36 all of which use a frusto-conical surface 52 in defining an aperture of different shape and/or size. As illustrated in the drawings, the aperture defined by the surface 52 is elliptical and the lens system functions with the reticle projection to provide a ring of non-actinic colored light to locate the center of interest. Any shape or size of aperture may be used in the probe device 13 and the changing of a slide is readily accomplished as the outer end of the same, as shown in FIG. 2, extends outwardly of the housing 15 through an opening therein suitably provided for this purpose.

As previously described, the lens system is adjustable to first sharply focus the red circle of light 56 on the work surface 11 and proper focusing of the same results in the focusing of the reflected image at the aperture of the slide 36 resulting in the light rays crossing over one another behind or above the aperture to prevent single point fatigue on the phototube within the housing 27. Focusing of the lens system further allows multiple use of a single slide 36 in connection with different size center of interest areas. The probe device 13 being adjustably mounted as described in connection with FIG. 1 may be raised or lowered to vary the dimensions of the ring 56 and the aperture reticle refocused by ready adjustment of the lens system. By utilizing a single member which combinedly acts as both a reticle and an aperture, the optical axes of both the reticle and the aperture coincide at all times and separate adjusting or aligning of these axes is unnecessary. Thus, careful and painstaking calibration for proper functioning as is necessary in the use of a reflex type of probe device is eliminated and no special skills are required in efficient continuous operation of the probe device of the present invention.

While the surface 52 defining the aperture reticle has been described as elliptical, frusto-conical, it will be understood that other geometrical configurations may be used. For example, the surface need not be continuous and may be of any shape as long as the scanning light is directed away from the phototube and toward the lens system.

The density measurement obtained from the reflected light contacting the phototube may be read from any known type of instrument for purposes of controlling exposure time during the printing process. Any known type of automatic photographic exposure timer may be connected to the phototube to provide a continuous printing operation. An exposure timing system of the type disclosed in the copending application, Serial No. 460,454, filed October 5, 1954, now U.S. Patent No. 2,885,563, issued May 5, 1959 is particularly adapted for use with the probe device of the present invention.

Obviously many modifications and variations of the invention as hereinbefore set forth may be made without departing from the spirit and scope thereof, and therefore only such limitations should be imposed as are indicated in the appended claims.

I claim:

1. A photographic exposure probe device including a housing having therein a light flux measuring probe and a lens system, aperture-reticle means intermediate said probe and said lens system, said aperture-reticle means including an aperture defined by a light directing reticle surface which is axially aligned with said probe and which is of varying diametric dimensions between its edges and expands axially toward said lens system, and light source supply and control means in said housing and aligned with said reticle surface to provide a light thereto for direction by said reticle surface toward said lens system, said lens system providing for reticle surface light projection out of said housing and light flux projection onto said probe through said aperture.

2. A photographic exposure probe device including a housing in the top portion of which is a light flux measuring probe, a lens system in said housing below said probe, and an aperture-reticle means intermediate said probe and said lens system, said aperture-reticle means including a translucent member having opaque outer surfaces and internally reflective inner surfaces, light source means in said housing and aligned with said member to provide light internally thereof, said member including an aperture defined by a light directing translucent reticle surface of varying diametric dimensions which between its edges expands axially toward said lens system and which is axially aligned within said housing with said probe and said lens system, said lens system providing for reticle surface light projection out of said housing and light flux projection onto said probe through said aperture.

3. A photographic exposure probe device including a housing having therein a light flux measuring probe and a lens system, an aperture-reticle device intermediate said probe and said lens system, said aperture-reticle device providing a delineating light pattern for center of interest location on a focused image and field limitation for probe viewing, said aperture-reticle device including an aperture-reticle housing formed from a substantially U-shaped block of translucent material having a continuous groove about the inner periphery thereof slidingly receiving therein an apertured slide, lamp mounting portions in said block about said slide having lamps mounted therein, substantial surface portions of said block and said slide being outwardly opaque and inwardly reflective to transmit the light of said lamps toward said slide aperture, said slide aperture being defined by a light directing translucent reticle surface of varying diametric dimensions which between its edges expands axially toward said lens system to transmit the internally reflected light of said block toward an image while allowing reflected image-defining light to pass in the opposite direction through said aperture, said lens system providing for reticle surface light projection out of said housing and light flux projection onto said probe through said aperture.

4. A photographic exposure probe device including a housing in the top portion of which is a light flux measuring probe, a lens system in said housing below said probe, and an aperture-reticle device for combinedly providing a delineating light pattern for center of interest location on a focused image and field limitation for probe viewing intermediate said probe and said lens system, said aperture-reticle device including an aperture-reticle housing formed from a substantially U-shaped block of translucent material having a continuous groove about the inner periphery thereof slidingly receiving therein an apertured slide, lamp mounting portions in said block about said slide having lamps mounted therein, all surfaces of said block with the exception of the inner peripheral surface portions defining a part of said groove and being in close proximity to said slide aperture having an inner coating of reflective material and an outer coating of opaque material to internally reflect the light of said lamps while preventing transmission of the same outwardly of said block, the outer surfaces of said slide with the exception of the side surface portions received in the uncoated portion of said groove being provided with an inner coating of reflective material and an outer coating of opaque material, said slide aperture being defined by a frusto-conical translucent surface adapted to transmit the internally reflected light of said block through said lens system toward an image while allowing reflected image-defining light to pass in the opposite direction through said aperture, said lens system providing for reticle surface light projection out of said housing and light flux projection onto said probe through said aperture.

5. A photographic exposure probe device including a housing in the top portion of which is a light flux measuring probe, a lens system in said housing below said probe, and an aperture-reticle device for combinedly providing a delineating light pattern for center of interest location on a focused image and field limitation for probe viewing intermediate said probe and said lens system, said aperture-reticle device including an aperture-reticle housing formed from a substantially U-shaped block of translucent material having a continuous groove about the inner periphery thereof slidingly receiving therein an apertured slide, lamp-receiving openings in said block about said slide and having lamps mounted therein, a lamp locating plate attached to said block and holding said lamps in alignment with said openings, said plate being centrally apertured for non-restricting alignment with the aperture of said slide, a contact and lamp holding ring attached to said plate and in engagement with the terminals of said lamps to combinedly with said plate provide means for completing the circuit of said lamps while holding the same in their operative positions, substantial surface portions of said block and said slide being outwardly opaque and inwardly reflective to transmit the light of said lamps toward said slide aperture, said slide aperture being defined by a frusto-conical translucent surface adapted to transmit the internally reflected light of said block toward an image while allowing reflected image-defining light to pass in the opposite direction through said aperture, said lens system providing for reticle surface light projection out of said housing and light flux projection onto said probe through said aperture.

6. A photographic exposure probe device including a housing in the top portion of which is a light flux measuring probe, a lens system in said housing below said probe, and an aperture-reticle device for combinedly providing a delineating light pattern for center of interest location on a focused image and field limitation for probe viewing intermediate said probe and said lens system, said aperture-reticle device including an aperture-reticle housing formed from a substantially U-shaped block of translucent material having a continuous groove about the inner periphery thereof slidingly receiving therein an apertured slide, lamp-receiving openings in said block about said slide and having lamps mounted therein, a lamp locating plate attached to said block and holding said lamps in alignment with said openings, said plate being centrally apertured for non-restricting alignment with the aperture of said slide, a contact and lamp holding ring attached to said plate and in engagement with the terminals of said lamps to combinedly with said plate provide means for completing the circuit of said lamps while holding the same in their operative positions, all surfaces of said block with the exception of the inner peripheral surface portions defining a part of said groove and being in close proximity to said slide aperture having an inner coating of reflective material and an outer coating of opaque material to internally reflect the light of said lamps while preventing transmission of the same outwardly of said block, the outer surfaces of said slide with the exception of the side surface portion received in the uncoated portion of said groove being provided with an inner coating of reflective material and an outer coating of opaque material, said slide aperture being defined by a frusto-conical translucent surface adapted to transmit the internally reflected light of said block toward an image while allowing reflected image-defining light to pass in the opposite direction through said aperture, said lens system providing for reticle surface light projection out of said housing and light flux projection onto said probe through said aperture.

7. A photographic exposure probe device including a housing in the top portion of which is a light flux measuring probe, a lens system in said housing below said probe, and an aperture-recticle device for combinedly providing a delineating light pattern for center of interest location on a focused image and field limitation for probe viewing, said aperture-reticle device including an aperture-reticle housing formed from a substantially U-shaped block of translucent material having a continuous groove about the inner periphery thereof slidingly receiving therein an apertured slide, lamp-receiving openings in said block about said slide, lamps mounted in said openings, translucent non-actinic colored cap-like member in said openings to cover the lamps received therein, substantial surface portions of said block and said slide being outwardly opaque and inwardly reflective to transmit the light of said lamps toward said slide aperture, said slide aperture being defined by a frusto-conical translucent surface to transmit the internally reflected light of said block through said lens system for projection thereby toward an image while allowing reflected image-defining light to pass through said aperture toward said probe as projected by said lens system.

8. An aperture-reticle device for use with a photographic exposure probe for combinedly providing a delineating light pattern for center of interest location on a focused image and field limitation for probe viewing, said device including an aperture-reticle housing formed from a substantially U-shaped block of translucent material having a continuous groove about the inner periphery thereof slidingly receiving therein an apertured slide, lamps mounted in said block about said slide, substantial surface portions of said block and said slide being outwardly opaque and inwardly reflective to transmit the light of said lamps toward said slide aperture, said slide aperture being defined by a light directing translucent surface which is slanted to transmit the internally reflected light of said block toward an image while allowing reflected image-defining light to pass through said aperture in the opposite direction.

9. An aperture-reticle device for use with a photographic exposure probe for combinedly providing a delineating light pattern for center of interest location on a focused image and field limitation for probe viewing, said device including an aperture-reticle housing formed from a substantially U-shaped block of translucent material having a continuous groove about the inner periphery thereof slidingly receiving therein an apertured slide, lamp-receiving openings in said block about said slide, lamps in said openings, a lamp locating plate attached to said block and positioning said lamps within said openings, said plate being centrally apertured for non-restricting alignment with the aperture of said slide, a contact and lamp holding ring attached to said plate and in engagement with the terminals of said lamps to combinedly with said lamp provide means for completing the circuit of said lamps while holding the same in their operative positions, substantial surface portions of said block and said slide being outwardly opaque and inwardly reflective to transmit the light of said lamps toward said slide aperture, said slide aperture being defined by a frusto-conical translucent surface adapted to transmit the internally reflected light of said block toward an image while allowing reflected image-defining light to pass through said aperture in the opposite direction.

10. An aperture-reticle device for use with a photographic exposure probe for combinedly providing a delineating light pattern for center of interest location on a focused image and field limitation for probe viewing, said device including an aperture-reticle housing formed from a substantially U-shaped block of translucent material having a continuous groove about the inner periphery thereof slidingly receiving therein an apertured slide, lamp-receiving openings in said block about said slide, lamps in said openings, all surfaces of said block with the exception of the inner peripheral surface portions defining a part of said groove and being in close proximity to said slide aperture having an inner coating of reflective material and an outer coating of opaque material to internally reflect the light of said lamps while preventing transmission of the same outwardly of said block, the outer surfaces of said slide with the exception of the side surface portions received in the uncoated portion of said groove being provided with an inner coating of reflective material and an outer coating of opaque material, said slide aperture being defined by a frusto-conical translucent surface adapted to transmit the internally reflected light of said block toward an image while allowing reflected image-defining light to pass through said aperture in the opposite direction.

11. An aperture-reticle device for use with a photographic exposure probe for combinedly providing a delineating light pattern for center of interest location on a focused image and field limitation for probe viewing, said device including an aperture-reticle housing formed from a substantially U-shaped block of translucent material having a continuous groove about the inner periphery thereof slidingly receiving therein an apertured slide, lamp-receiving openings in said block about said slide, lamps in said openings, a lamp locating plate attached to said block and positioning said lamps within said openings, said plate being centrally apertured for non-restricting alignment with the aperture of said slide, a contact and lamp holding ring attached to said plate and in engagement with the terminals of said lamps to combinedly with said plate provide means for completing the circuit of said lamps while holding the same in their operative positions, all surfaces of said block with the exception of the inner peripheral surface portions defining a part of said groove and being in close proximity to said slide aperture having an inner coating of reflective material and an outer coating of opaque material to internally reflect the light of said lamps while preventing transmission of the same outwardly of said block, the outer surfaces of said slide with the exception of the side surface portion received in the uncoated portion of said groove being provided with an inner coating of reflective material and an outer coating of opaque material, said slide aperture being defined by a continuous frusto-conical translucent surface adapted to transmit the internally reflected light of said block toward an image while allowing reflected image-defining light to pass through said aperture in the opposite direction.

12. An aperture-reticle device for use with a photographic exposure probe for combinedly providing a delineating light pattern for center of interest location on a focused image and field limitation for probe viewing, said device including an aperture-reticle housing formed from a substantially U-shaped block of translucent material having a continuous groove about the inner periphery thereof slidingly receiving therein an apertured slide, lamp-receiving openings in said block about said slide, lamps in said opening, translucent non-actinic colored cap-like members in said openings to cover the lamps received therein, substantial surface portions of said block and said slide being outwardly opaque and inwardly reflective to transmit the light of said lamps toward said slide aperture, said slide aperture being defined by a frusto-conical translucent surface adapted to transmit the internally reflected light of said block toward an image while allowing reflected image-defining light to pass through said aperture in the opposite direction.

References Cited in the file of this patent

UNITED STATES PATENTS

| | | |
|---|---|---|
| 2,484,299 | Labrum | Oct. 11, 1949 |
| 2,654,858 | Feller | Oct. 6, 1953 |
| 2,668,474 | Rogers | Feb. 9, 1954 |
| 2,800,834 | Petry et al. | July 30, 1957 |

FOREIGN PATENTS

| | | |
|---|---|---|
| 1,044,263 | France | June 17, 1953 |